(No Model.)
S. JOHNSTON & B. H. RINEHART.
CAR COUPLING.
No. 575,244. Patented Jan. 12, 1897.
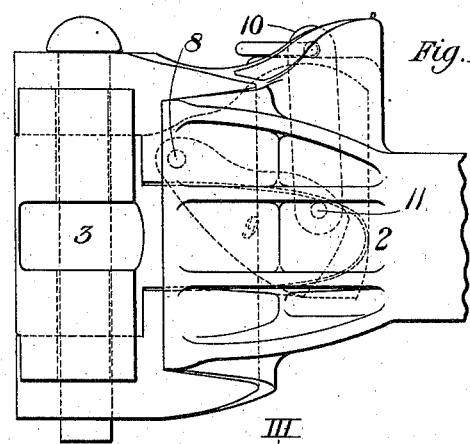
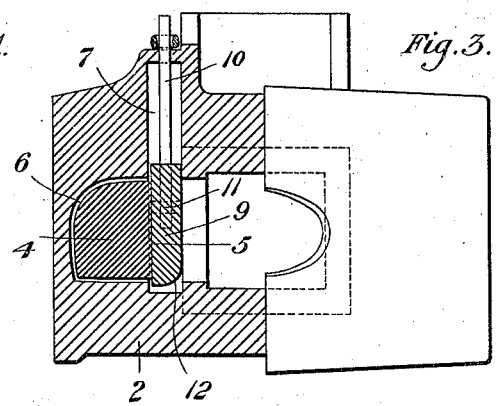
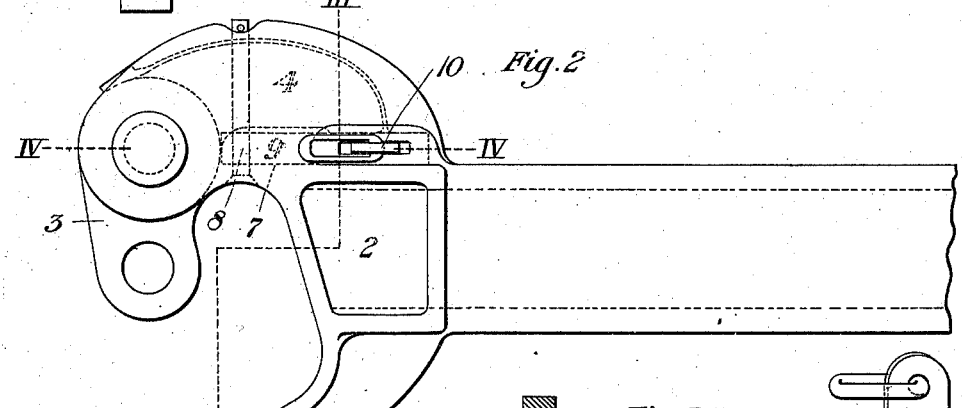
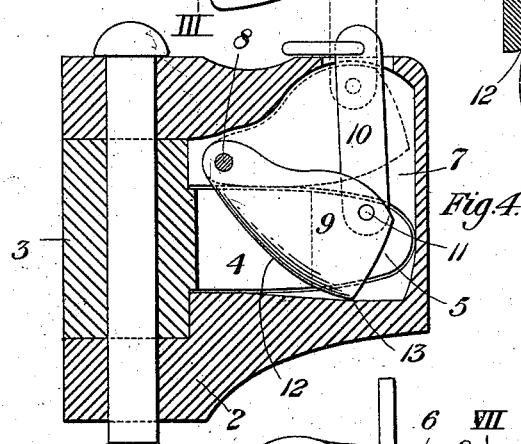
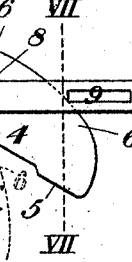
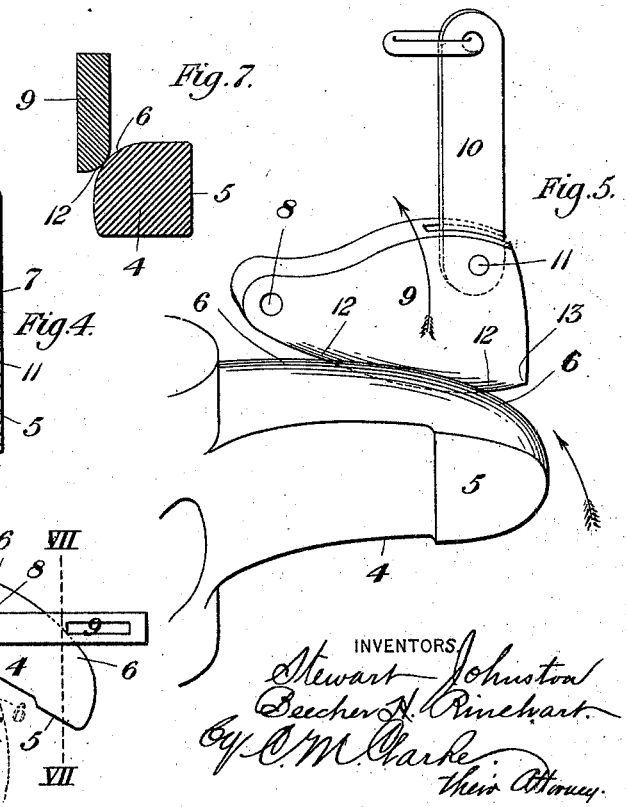
WITNESSES.
INVENTORS
Stewart Johnston
Beecher H. Rinehart
by C. M. Clarke
their Attorney.

UNITED STATES PATENT OFFICE.

STEWART JOHNSTON AND BEECHER H. RINEHART, OF ALLIANCE, OHIO.

CAR-COUPLING.

SPECIFICATION forming part of Letters Patent No. 575,244, dated January 12, 1897.

Application filed August 3, 1896. Serial No. 601,423. (No model.)

*To all whom it may concern:*

Be it known that we, STEWART JOHNSTON and BEECHER H. RINEHART, citizens of the United States, residing at Alliance, in the county of Stark and State of Ohio, have invented or discovered a new and useful Improvement in Car-Couplers, of which the following is a full, clear, and exact description, reference being had to the accompanying drawings, forming part of this application, in which—

Figure 1 is a view in side elevation of our improved draw-head. Fig. 2 is a plan view thereof. Fig. 3 is a partial cross-sectional view taken on the line III III of Fig. 2. Fig. 4 is a longitudinal vertical sectional view taken on the line IV IV of Fig. 2. Fig. 5 is a detail view in perspective, illustrating the tail of the swinging jaw riding under the locking-gate. Fig. 6 is a detail view showing the same parts in plan. Fig. 7 is a cross-sectional detail view taken on the line VII VII of Fig. 6.

Similar numerals of reference refer to like parts wherever used throughout this specification.

Our invention relates to the class of twin-jaw couplers conforming to the Master Car-Builders' standard, and has reference more particularly to the mechanism employed for locking and unlocking the tail of the swinging jaw, the construction otherwise involving no change from the well-known and commonly-used type of "Janney" couplers.

Referring to the drawings, 2 is the draw-head, in which is pivoted the usual swinging jaw or knuckle 3, provided with the extended tailpiece 4, made with a vertical flat face 5 on its inner side and having the outer side rounded from the base to the tip on the upper outer portion, as at 6. The draw-head is provided with a vertical longitudinal chamber 7, extending lengthwise of its body across the path of the tail 4 and immediately in front of it when the swinging jaw is locked, as shown in Fig. 2. Pivoted at 8 in the upper forward portion of this chamber, above the upper edge of the tail 4, is the locking gate or latch 9, made of a width to fit neatly within the chamber 7 and free to move vertically, as to its body portion, on the pivot 8.

The chamber 7 is enlarged at its upper portion sufficiently to admit of the gate being forced or drawn up out of the way of the tail 4, as indicated in dotted lines in Fig. 4, a short connecting-link 10, pivoted to the gate at 11, being provided for such purpose.

It will be understood that suitable connections may be made with the top of the link 10 and operative mechanism mounted on the car-body, whereby the gate may be lifted from the outside.

On its inner under surface the corner of the gate or latch is rounded along its length, as at 12, the tip 13 being square where it rests on the bottom of the chamber 7, as shown in Fig. 4, so as to permit the tail 4 to ride under and raise the gate in its backward movement, the rounded part of the tail contacting with the similar part of the gate and facilitating such action. Inasmuch as the gate is pivoted above the tail, its body portion depending downwardly toward the bottom of the chamber 7, and as the rounded part of the tail approaches and comes in contact with the edge of the gate in a direction approximately a right angle, it will be seen that the tail will ride under the locking-gate with comparative ease until clear back and free of the gate, when it will drop by gravity in front of the tail, as clearly shown in Figs. 2, 3, and 4. As the gate has a broad bearing against the inside face of the chamber 7 the tail will be retained in such position and consequently will retain the swinging jaw until the gate 9 is raised, when the device may be uncoupled.

Our improved coupler is designed to be used with any of the forms made in accordance with the Master Car-Builders' standard, and its simplicity, cheapness, and durability will commend it to those familiar with the art.

Having described our invention, what we claim, and desire to secure by Letters Patent, is—

1. In a car-coupling the combination of a hollow draw-head, a pivoted knuckle adapted to swing into said draw-head having a tailpiece convexly rounded upon the upper and outer side substantially of its entire length, and provided with an inner flat vertical bearing-surface, a gravity-operated latch pivoted longitudinally of the draw-head having a rounded convex inner under surface for engaging with the rounded surface of the tail of the knuckle during the entire inward movement thereof, said latch being entirely inclosed within the draw-head in a vertical longitudinal chamber, immediately in rear of the pivot of the knuckle, and having also a flat vertical bearing-surface adapted to engage with the flat vertical bearing-surface of the tail of the knuckle when in a locking position, the pivot of said latch being located at its extreme forward end within the front portion of said vertical chamber, whereby the point of contact between the tail of the knuckle and the latch in relation to the pivotal bearing of the latch recedes from such pivotal bearing on the closing of the hook, thereby steadily increasing the leverage of the tailpiece upon the locking-plate, substantially as set forth.

2. In a car-coupling the combination of a hollow draw-head, a pivoted knuckle adapted to swing into said draw-head having a tailpiece convexly rounded upon the upper and outer side substantially of its entire length, and provided with an inner flat vertical bearing-surface, a gravity-operated latch pivoted longitudinally of the draw-head having a rounded convex inner under surface for engaging with the rounded surface of the tail of the knuckle during the entire inward movement thereof, said latch being entirely inclosed within the draw-head in a vertical longitudinal chamber, immediately in rear of the pivot of the knuckle, and having also a flat vertical bearing-surface adapted to engage with the flat vertical bearing-surface of the tail of the knuckle when in a locking position, the pivot of said latch being located at its extreme forward end within the front portion of said vertical chamber, whereby the point of contact between the tail of the knuckle and the latch in relation to the pivotal bearing of the latch recedes from such pivotal bearing on the closing of the hook, thereby steadily increasing the leverage of the tailpiece upon the locking-plate, and means for disengaging said latch and knuckle, substantially as set forth.

In testimony whereof we have hereunto set our hands this 20th day of July, 1896.

STEWART JOHNSTON.
BEECHER H. RINEHART.

Witnesses:
J. W. CRAINE,
C. M. SEELY.